United States Patent [19]

Yoon et al.

[11] Patent Number: 5,132,393

[45] Date of Patent: Jul. 21, 1992

[54] WHOLLY AROMATIC POLYAMIDES AND COPOLYAMIDES, AND PROCESS THEREFOR

[75] Inventors: Han S. Yoon; Tae W. Son; Chul J. Lee; Byung G. Min, all of Seoul; Jae W. Cho, Anyang, all of Rep. of Korea

[73] Assignee: Korea Institute of Science and Technology, Seoul, Rep. of Korea

[21] Appl. No.: 708,167

[22] Filed: May 31, 1991

[30] Foreign Application Priority Data

Jul. 10, 1990 [KR] Rep. of Korea .................... 90-10394

[51] Int. Cl.$^5$ .................. C08G 63/44; C08G 69/00
[52] U.S. Cl. .................................. 528/288; 528/332; 528/336; 528/338
[58] Field of Search ................. 528/220, 87, 117, 289, 528/322, 422, 388, 332, 336, 338; 525/59, 282, 531

[56] References Cited

U.S. PATENT DOCUMENTS 3,960,818 6/1976 Spiewak .............................. 528/336
4,384,112 5/1983 Paschke et al. ..................... 528/336

Primary Examiner—John Kight, III
Assistant Examiner—Duc Truong
Attorney, Agent, or Firm—Oblon, Spivak, McClelland, Maier & Neustadt

[57] ABSTRACT

Novel wholly aromatic polyamides and copolyamides of the formula:

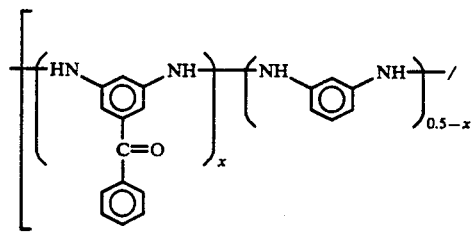

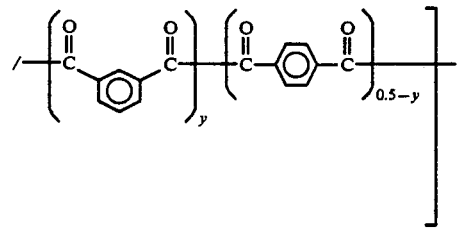

are provided. The aromatic polyamides and copolyamides are prepared by condensation polymerizing an aromatic diamine selected from 3,5-diaminobenzophenone and a mixture of 3,5-diaminobenzophenone and m-phenylenediamine with an aromatic dibasic acid chloride in a chemical equivalent amount. The polymers of the invention can be easily dissolved in an organic solvent to give a molding solution suitable for use in the film casting. The film resulted from the polyamides of the invention has excellent physiochemical properties such as durability, chemical resistance, flexibility, compactness, tenacity, transparency and electric insulation.

10 Claims, No Drawings

WHOLLY AROMATIC POLYAMIDES AND COPOLYAMIDES, AND PROCESS THEREFOR

BACKGROUND OF THE INVENTION

1. Field of the Invention

The present invention relates to novel wholly aromatic polyamides and copolyamides with new structures, process for preparing the same polyamides and films resulted from the same polyamides.

2. Description of the Prior Art

It has been known that since in the conventional high performance aromatic polyamides the constituent molecular chains are very stiff, those materials manufactured from the aromatic polyamides of such type, for example, films, fibers, etc., tend to undergo fibrillation resulting in cleavage and are difficult to stretch. Owing to these drawbacks, the durability becomes lowered rapidly when the materials are used in the place to which an external force is applied in traverse direction or a repeated load is applied.

On the other hand, aliphatic polyamides of flexible molecular chains have high elongation and low tendency to fibrillation. However, these aliphatic polyamides fail to meet the requirements of the high performance heat resistant materials due to poor strength, low modulus and shortage of heat resistance thereof.

Aromatic polyamides not only have a high glass transition temperature and a high melting point (in practice, there are many cases where decomposition occurs at a temperature below the melting point), but also are superior in terms of thermal stability and chemical resistance. Thus, the materials resulted from such aromatic polyamides are suitable for use in the utility where high heat resistance and weather resistance are required. Despite these advantages, the aromatic polyamides suffer from defects that they are still difficult to mold into desired materials.

Fibers having ultrahigh strength and modulus can be prepared by using the aromatic polyamides or copolyamides of the molecular chains straightly extended from both ends of the aromatic ring toward its parallel direction. For example, such fibers include the "Kevlar" fiber, commercially available from E. I. Du Pont de Nemours and Company, Wilmington, Del. U.S.A., which is prepared from poly(p-phenyleneterephthalamide. In spite of their outstanding stiffness and symmetry, the aromatic polyamides encounter with the difficulty in molding into desired materials due to their tendency to be decomposed below the melting point as well as the significantly low solubility in organic solvents. Practically, poly(p-phenyleneterephthalamide) is dissolved in very limited kinds of solvents. The representative solvents may include strong inorganic acids, e.g., conc. sulfuric acid, and a mixture of an alkali metal salt, e.g., LiCl in hexamethylphosphoamide and N-methylpyrrolidone. Among these, the solvent which is useful for the purpose of molding polymer is strong inorganic acids only.

The use of strong inorganic acids may cause various problems such as corrosion of the installation and equipment, dangers and difficulties in handling, treatment of waste liquid and intricate of operations for dissolving the polymers in the solvent. In addition, when using sulfuric acid as the solvent, the sulfuric acid rapidly leave from the polymer molecular chains when the coagulation occurs in the polymerization solution after molding. The sulfuric acid thus left accelerates the fibrillation which is a drawback of linear stiff chains. The fibrillation of the molded article accelerated by the inorganic acid may be one of the fatal drawbacks in the aramid materials having various utility as the reinforcing materials. In spite of these disadvantages, fibers having high strength and high modulus can be produced by means of the liquid crystal spinning where an inorganic acid is used as a solvent. However, due to their high crystallinity and fibrillation, it is not substantially possible to prepare films. Moreover, it is almost impossible to prepare transparent films.

As a typical example of the high performance heat resistant films which are well known and widely used, there can be mentioned a polyimide film which is commercially available under trade name "Kapton" by E. I. Du Pont de Nemours and Company. The Kapton film has high heat resistance and other required electric porperties, and is used as the passivation layer in the production of insulation materials for the usage at high temperatures, integrated circuits, or flexible circuit boards. The polyimides take an increasing interest in the fields of commerce and industry due to their superior mechanical properties and heat and oxidization resistance, and are now used in the fields of industry such as electrics, electronics, automobils, aeronautic spaces, packaging, etc., in place of the metals and glass.

Polyimides have different physicochemical properties depending on the molecular structures thereof. Particularly, the polyimides drived from aromatic diamines and aromatic dibasic acid anhydrides have the desired properties for use in the high performace utility. The most useful property of aromatic polyimides is the stability to heat and oxidization. For example, polypyromellitimide prepared from pyromellitic acid dianhydride as an aromatic dibasic acid anhydride and m-phenylenediamine or 4,4'-diaminodiphenylether as an aromatic diamine exhibits superior thermal stability (i.e., the weight loss according to the thermogravimetric analysis is 2% or less) at a temperature higher than 500° C. in vacuum or under a nitrogen atmosphere.

In general, polyimides are very stable against hydrolysis and chemicals except for a strong alkali. Especially, polypyromellitimide or polyetherimide with high crystallinity is insoluble in orgarnic solvents, but soluble in strong acids such as sulfuric acid, like the aromatic polyamides mentioned above. Thus, the materials prepared from these aromatic polyimides can desirably be used in the usage where the heat resistance and weather resistance are required. However, it is very difficult to mold them into materials. In fact, it is impossible to mold aromatic polyimides, particularly polypyromillitimide, in a molten condition. Therefore, the two step molding process has been adopted which comprises molding a solution of unstable poly(amidic acid) precusor dissolved in a solvent into a film; and forming imide rings on the film by treating with heat or chemicals. The above post-treatment imidation results in those problems such as complexity in procedures, increasement in manufacturing costs, etc. As an approach to solve these problems, there have been developed the modified polyimide or polyamide films, such as addition polymerization type polyimide films. However, these modified films suffer from poor mechanical properties.

It has been known that the solubility of polyamides and copolyamides having the stiff linear molecular chains extended from both ends of the aromatic ring toward its parallel direction can be increased by rendering the molecular chains flexible at both ends of the aromatic ring. To this end, meta-linkage ring units or rotatable bonds are introduced into a position between the aromatic rings, or pendant units in a suitable size are introduced along the molecular chains. However, in general, introduction of the modified units mentioned above into the copolyamides results in the degradation of physicochemical properties. It is possible to prepare special copolyamides which are not accompanied by the degradation of physicochemical properties. However, the copolyamides are significantly expensive in cost, resulting in economical disadvantages.

SUMMARY OF THE INVENTION

An object of the invention is to provide wholly aromatic polyamides and copolyamides having such an improved solubility that a polymeric solution having fluidity and stability suitable for the manufacture of transparent films of thermal stability and economical viability can be prepared, and a process for the preparation of the same.

Another object of the invention is to provide a high performance heat resistant aromatic polyamide or copolyamide transparent film having improved properties such as durability, chemical resistance, transparency, etc., as compared with the films according to prior art processes, which conventionally comprise first molding an unstable precursor into films and then post-treating the resultant films.

Other objects and advantages of the invention will become apparent from the following description of the INVENTION.

These and other objects of the invention can be achieved by providing an aromatic polyamide or copolyamide in which 5-benzoly-1,3-diaminophenylene having an attaching unit and a flexible portion represented by the formula

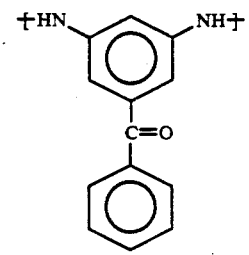

is introduced into the recurring units of the stiff aromatic polyamide polymers.

DETAILED DESCRIPTION OF THE INVENTION

According to the present invention, 3,5-diaminobenzophenone of the formula:

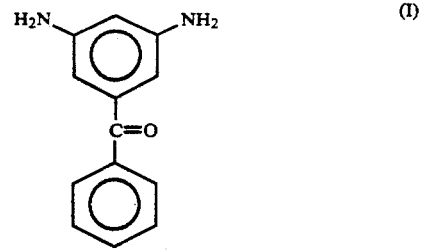

is used as an aromatic diamine compound in condensation polymerization with various kinds of dibasic acid chlorides to give a desired aromatic polyamide polymer. Alternatively, 3,5-diaminobenzophenone in admixture with m-phenylenediamine is used in condensation polymerization with aromatic dibasic acid chlorides to give an aromatic copolyamide.

As can be seen from the above formula (I), 3,5-diaminobenzophenone has both the meta-linkage ring capable of introducing the flexible portion into molecular chains and the the benzoly group as an attaching unit, in an aromatic diamine compound. These types of aromatic diamine compounds can form a stiff amide bond by means of condensation polymerization with aromatic dibasic acid chlorides. The flexible portion and the attaching unit present in the diamines may endow the molecular chains with relative flexibility; thus, they exhibit high improvement on the properties of the polymer in view of durability, flexibility, compactness, tenacity, etc., as compared with the polymers simply having stiff molecular chain characteristics or flexible molecular chain characteristics.

In accordance with the present invention, a polymerization solvent is prepared by dissolving an alkali metal salt in a tert-amide solvent. Then, 3,5-diaminobenzophenone or a mixture of 3,5-diaminobenzophenone and m-phenylenediamine is subjected to condensation polymerization at a low temperature with an aromatic dibasic acid chloride in the polymerization solvent to give an aromatic polyamide or copolyamide of the formula:

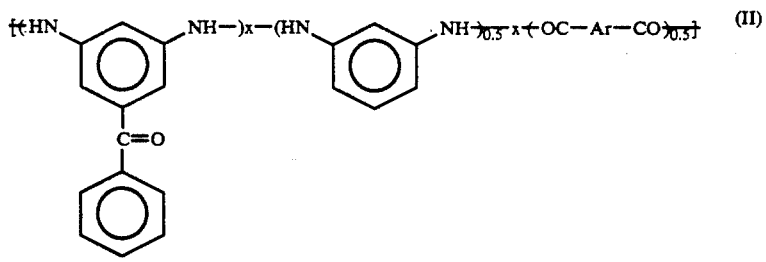

wherein, x is 0.05 to 0.5 and Ar represents a m-phenylene or p-phenylene group.

The amount of the diamine used is adjusted so that the concentration of the resultant polymers in the reaction mixture is 5 to 30% by weight based on the polymerization solvent. The aromatic polyamide or copolyamide of the formula (II) above is dissolved in an organic amide solvent and the resultant solution is molded by a dry or wet process into a film, which is heat-stretched to give a high performance heat resistant film.

The aromatic polyamide film thus prepared overcomes the disadvantages of the prior art films, that is, difficulties in the elongation and of the fibrillation which are caused from the stiffness of molecular chains and accelerated by the use of sulfuric acid as a solvent. Moreover, due to the relative flexibility of the chains of the constitutent molecules and the use of organic solvent, the aromatic polyamide film exhibits outstanding chemical resistance, durability and transparency, as well as high elongation. Especially, the film according to the present invention is unicolored and transparent, which is advantageous as the heat resistant film over the conventional dark colored transparent or translucent Kapton film.

In addition, the novel aromatic polyamides of the present invention are readily dissolved in an organic amide solvent such as N,N'-dimethylacetamide, N-methylpyrrolidinone, tetramethylurea, etc. Thus, they are advantageous over the conventional para-aromatic polyamides which are soluble only in strong inorganic acids, in view of both the procedure and the properties of materials.

More specifically, since the aromatic polyamides of the present invention is dissolved in an organic amide solvent, it is possible to prepare films by means of a dry process. And, the inner structure of the resulting film can be made more compacted because the solvent used can be removed at a slower speed as compared with the prior art process where conc. sulfuric acid is used. Due to non-use of inorganic acids such as sulfuric acid, the film of the present invention is superior in terms of insulation, as well as durability, chemical resistance, flexibility, compactness, tenacity, and transparency.

It has been reported that in order to prepare materials having high strength and high modulus from the conventional aromatic polyamides, the molecular chains of the polymers which constitute the materials must be stiff and the molding must be effected in a solution-liquid crystal condition. In contrast to this common knowledge, despite that the aromatic polyamides of the present invention are decreased in their stiffness and crystallinity and cannot be formed into a solution-liquid crystal, the film resulted from the aromatic polyamides of the invention exhibits considerably high strength and high modulus. Further, because in order to mold the prior art polyamides which are solely consisting of the stiff molecular chains, inorganic acids must be used as a solvent, the article thus molded cannot avoid fibrillation. Therefore, it has been possible to mold prior art polyamides into one dimensional materials such as fibers, but it has been almost impossible to obtain two dimensional materials such as films. Particularly, transparent films could not have been produced at all. In contrast, the polyamides of the present invention can be dissolved in an organic amide solvent because of the relative flexibility of their molecular chains as compared with the stiff chain polyamides. Attributing to this property, it is possible to prepare an isotropic polymer solution, which can be molded into a film by using either a dry or a wet process.

The aromatic polyamides according to the present invention are prepared by condensation polymerization of 3,5-diaminobenzophenone with isophthaloyl chloride. In addition, the aromatic copolyamides of the present invention are prepared by utilization of 3,5-diaminobenzophenone in admixture with m-phenylenediamine as a diamine monomer. That is, the above diamine mixture is subjected to condensation polymerization with isophthaloyl chloride or a mixture of isophthaloyl chloride and terephthaloyl chloride as a dibasic acid chloride to give the copolyamides of the present invention.

Where the copolyamide contains m-phenylenediamine in an amount of 90% or more of the diamine monomers, solubility of the resultant polymer in organic solvents decreases due to its stiffness. Thus, it is impossible to dissolve the resultant polyamide in an aromatic tert-amine in order to prepare a film molding solution having a desired concentration. On the other hand, when the content of m-phenylenediamine falls within the range of from 30 to 90%, a molding solution thereof can be prepared, giving a film. But, the production of a transparent film is possible only under the operation by those skilled in the art. The content of 3,5-diaminobenzophenone in the copolymeric polyamides is 0.05 to 0.5, preferably 0.15 to 0.5 in a mole ratio based on the total mole number of the constituent units of the copolymers including the diamine and dibasic acid units. However, the sum of the mole fractions of 3,5-diaminobenzophenone and m-phenylenediamine must be 0.5. In addition, the proportion of isophthaloyl chloride to terephthaloyl chloride in the copolymeric polyamides is 0 to 0.5:0 to 0.5 in a mole ratio based on the total mole number of constituent units of the copolymers including the diamine and dibasic acid units. However, the sum of the mole fractions of the two dibasic acid chlorides must be 0.5.

After completing the condensation polymerization mentioned above, the resultant polymer is dissolved in an amide solvent to give a molding solution suitable for the purpose of film production. Then, the molding solution so prepared is subjected to film casting to form a film. In this procedure, removal of the amide solvent used can be effected by a wet process using a solvent such as water, alcohol, etc. or a dry process using dried air. The film thus molded is then subjected to hot elongation, so that the strength and modulus of the film are enhanced and the inner structure of the film becomes more compacted. Thus, the film can be provided with the sufficient properties for use as a high strength and high performance material.

The process for preparing a polymer of the invention is described in detail hereinbelow.

That is, 3,5-diaminobenzophenone is dissolved in a tert-amide solvent. To the resultant solution is added a chemical equivalent of isophthaloyl chloride at a temperature below room temperature; thereby a rapid condensation polymerization as set forth below arises with emitting heat to give an aromatic polyamide polymer of the formula (III):

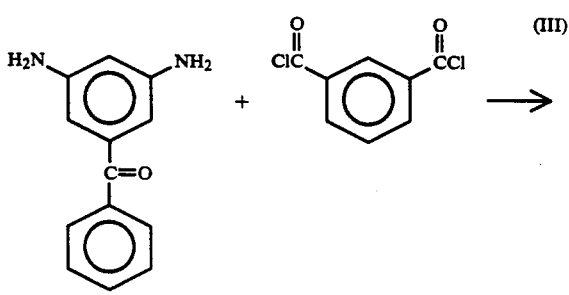

condensation polymerization as set forth below arises rapidly with emitting heat to give a copolyamide of the formula (IV):

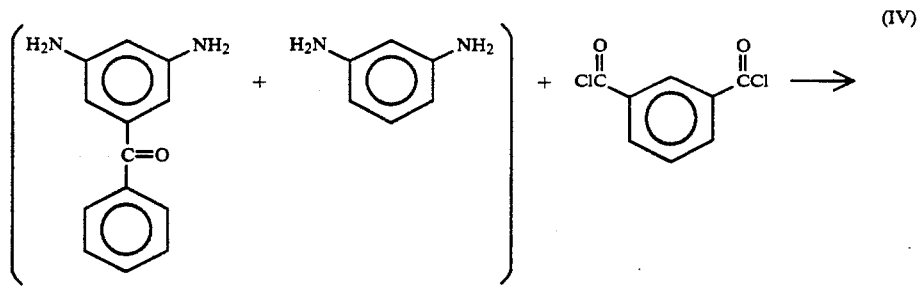

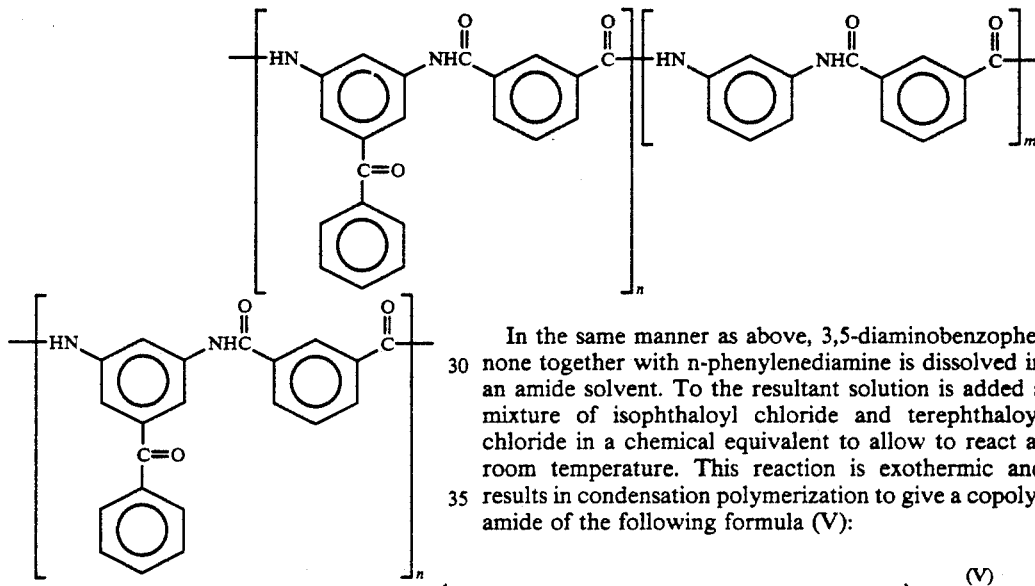

In the same manner as above, 3,5-diaminobenzophenone together with n-phenylenediamine is dissolved in an amide solvent. To the resultant solution is added a mixture of isophthaloyl chloride and terephthaloyl chloride in a chemical equivalent to allow to react at room temperature. This reaction is exothermic and results in condensation polymerization to give a copolyamide of the following formula (V):

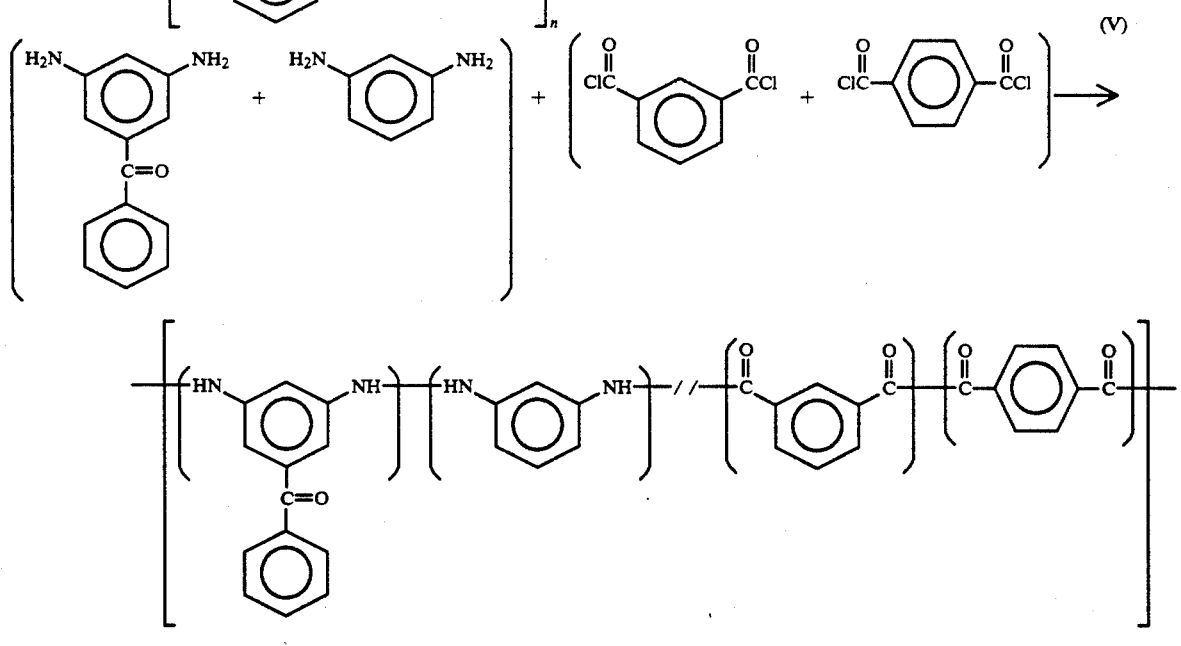

On the other hand, 3,5-diaminobenzophenone and m-phenylenediamine are together dissolved in a tert-amide solvent. To the resultant solution is added a chemical equivalent of isophthaloyl chloride; thereby The polymerization solvent suitable for the above condensation polymerization includes N,N'-dimethylacetamide, N-methylpyrrolidinone, hexamethylphosphoamide, N-methylpiperidone, N,N,N',N'-tetramethylurea, N-methylcaprolactam, N,N'-diethylacetamide and N-ethylpyrrolidinone, and a mixture thereof.

In order to increase the solubility of unreacted materials and resultant polymers, it is preferred to add to the amide solvent an alkali metal salt such as calcium chloride, lithium chloride, etc. in an amount of 1 to 10% by weight.

In addition, it is advantageous to add an aromatic tert-amine such as pyridine, picoline, quinoline, etc. to the amide solvent in an amount of 1 to 10% by weight as the reaction promoter for more easilier running of the reaction. However, an amount exceeding 10% by weight may adversely affect the improvement of the polymerization degree, and thus is not preferred.

The aromatic dibasic acid chloride useful in the present invention includes terephthaloyl chloride and isophthaloyl chloride. Especially, a mixture of isophthaloyl chloride and terephthaloyl chloride is most preferred for accomplishing the objects of the present invention.

The resultant polymers are recovered after completion of the polymerization. The polymers so recovered are dissolved in an organic amide solvent to give a molding solution, from which a film is prepared through a dry or a wet process. In preparing the molding solution, the organic solvent for dissolving the polymers may be selected from the group consisting of N,N'-dimethylformamide, N,N'-dimethylacetamide and N-methylpyrrolidinone. The film thus obtained can be heat-elongated up to 700 % at a temperature from 250° C. to 500° C.

Molecular weights of the polymers or copolymers according to the present invention are evaluated as follows. That is, a dried and powdered polymer is dissolved in a 97% sulfuric acid to give a solution having a concentration of 0.5 g/dl. Measurement of the relative viscosity, ln $\eta$ rel, is made of the resultant solution at 30° C. Then, the relative viscosity so measured is converted into the intrinsic viscosity, I.V., in accordance with the following equation:

$$I.V. = \frac{\ln \eta rel}{C}$$

wherein C represents a concentration of 0.5 gram of polymer in 100 ml of the sulfuric acid expressed in terms of 0.5g/dl. The molecular weight of the polymer is evaluated in a relative value based on the intrinsic viscosity.

The intrinsic viscosity of the aromatic polyamides and copolyamides according to the present invention falls within the range of from 0.8 to 4.0. However, it is preferred to have a value of 2.0 or more for the high performance purpose. The polymers of the present invention is highly stable to heat and thus, the film resulted from these polymers have the inner structure highly compacted due to the use of an organic solvent and are superior in their heat stability to the prior art aromatic polyamide materials prepared from a liquid crystal solution or a sulfuric acid solution.

Differential thermal analysis and thermogravimetric analysis reveal that the polymers of the present invention have a termal decomposition temperature of 420° C. or higher and exhibit a weight loss less than 3% at the same temperature.

The process for manufacturing a film from the polymers of the present invention is described in greater detail hereinbelow.

First, polymer solution is prepared by dissolving 3,5-diaminobenzophenone or a mixture of 3,5-diaminobenzophenone and m-phenylenediamine in an amide solvent. To the resulting solution is added a dibasic acid chloride to undergo condensation polymerization. The concentration of the polymer produced is adjusted to 5 to 30% by weight, preferably 10 to 20% by weight based on the polymerization solvent. The polymer solution after completion of the polymerization reaction is a clear, slightly viscous solution. The resultant solution is tightly sealed and allowed to stand for a day. Then, it is placed in a mill together with water to pulverize the polymer, followed by filtration. The polymer thus recovered is sufficiently washed with water, ethanol and acetone, in turn, and then dried. The resultant polymer is dissolved in an organic solvent mentioned above to give a molding solution.

A film is not formed when the concentration of polymers is less than 10% based on the organic solvent; whereas a homogeneous molding solution is not prepared due to limitation in the solubility of polymers when the concentration exceeds 30%. Thus, the concentration must fall within the range of from 10 to 30 % by weight. However, when the concentration is higher than 25%, the viscosity of molding solution may be increased so as not to carry out the film casting. From the foregoing, it is most preferred that the concentration falls within the range of from 15 to 25% by weight.

The resulting molding solution is coated on a glass plate in a thin film. The glass plate carrying the film is then placed in a hot vacuum drier to completely remove the solvent and washed with water, followed by drying to give a very tenacious, transparent film. The resulting film can be heat-elongated in all directions, i.e. traversely or lengthwise at a high ratio. Thus, the film so obtained exhibits excellent mechanical properties and high heat resistance and does no undergo change in transparency even after the hot elongation.

The draw ratio useful for the preparation of films is from 1:1.3 to a value immediately before breakage. However, when the draw ratio exceeds 1:7, the physicochemical properties may be decreased owing to the breakage of molecular chains and the fibrillation, i.e., crack of the films. Therefore, the preferred draw ratio for rendering superior mechanical and thermal properties is 1:3 to 1:6.

The elongation is effected on a hot plate or rod at a temperature ranging from the glass transition temperature to the brittleness temperature. At a temperature below the glass transition temperature, the film is not extended by the elongation because the molecular chains are not moved at all. The movement of molecular chains suitable for elongation can be obtained at a temperature considerably higher than the glass transition temperature; thus, the elongation is effected at a high temperature in practice. On the other hand, the glass transition temperature of the copolymers according to the present invention varies depending on the composition of polymer, i.e., the proportion of monomers used. Thus, the film resulted from the copolymers of the present invention can be elongated at least at 250° C. However, when the elongation is effected at a temperature over 500° C., the molecular chains are decomposed, resulting in a film having deteriorated mechanical properties and a dark color. In addition, the brittleness can be inhibited by effecting the elongation at a temperature of from 420° C. to 500° C. for a very short time. Consequently, the elongation is preferably effected at a temperature of from 250° C. to 500° C., more preferably at a temperature of from 300° C. to 420° C. The resultant film which has undergone heat elongation exhibits a tensile strength of from 100 to 200 kg/mm² and a tensile elasticity of from 1,000 to 3,000 kg/mm².

The film thus produced has excellent transparency, chemical resistance, flexibility, tenacity and durability, as well as heat resistance. Moreover, the film is superior in its electric insulation due to exclusion of the necessity of inorganic acids. Owing to these properties, the films of the present invention are suitable for use in the fields of various industries such as machinaries, electrics, electronics, automobiles, aircrafts, computers, etc. as the high performance materials, for example, structural materials, circuit boards, insulation plates, transparent protecting boards, etc.

DESCRIPTION OF THE PREFERRED EMBODIMENT

The invention will be illustrated in greater detail by way of the following examples. The examples are presented for illustrative purpose only and should not be construed as limiting the invention which is properly delineated in the claims.

EXAMPLE 1

This example illustrates the preparation of an aromatic polyamide by means of condensation polymerization of 3,5-diaminobenzophenone and isophthaloyl chloride and the preparation of a film from the same aromatic polyamide.

1) Preparation of poly(5-benzoly-1,3-phenylene)isophthalamide

N,N'-dimethylacetamide (240 mL), lithium chloride (9.0 g) and 3,5-diaminobenzophenone (12.72 g, 0.06 mole) were introduced into a 500 mL four-way round bottom flask equipped with a nitrogen inlet, a thermometer and a stirrer while stirring under a nitrogen stream to give a clear solution. The solution thus obtained was cooled to 5° C. Pyridine (14.3 g) was added to the solution. Powdered isophthaloyl chloride (12.2 g, 0.06 mole) was added to the resultant mixture at once with vigorously agitating. The viscosity of the mixture increased rapidly in a few minutes resulting in a viscous solution. This solution was cooled to 25° C. to 40° C. and maintained at the same temperature. The resultant solution was stirred for more than an hour and tightly sealed. Thereafter, the solution was allowed to stand for a day at room temperature to complete the reaction. The resultant was a viscous solution. This solution was placed in a mill together with an excess amount of water and milled so that the polymer was precipitated in the form of powder. The precipitated polymer was recovered by filtration. The recovered polymer was washed several times with water, ethanol and acetone, in turn, to completely remove the solvent and unreacted materials and then dried for 6 hours in a vacuum drier at 80° C. The resultant polymer has an intrinsic viscosity of 2.1.

2) Preparation of a film from poly(5-benzoyl-1,3-phenylene) isophthalamide

The powdered polymer prepared by the same process as Section 1) above was completely dried. The polymer powder was added to N,N'-dimethylformamide in an amount of 20% by weight with agitating and completely dissolved. The resultant solution was filtered through a 400 mesh filter to give a molding solution. The molding solution so prepared was undergone to film casting on a glass plate in a film thickness of 0.2 mm by using a push board. The glass plate carrying the film was placed in a vacuum drier at 60° C., and the solvent was removed to give a transparent film. Thereafter, the glass plate was immersed in water for a day to peel off a film and the remaining solvent was removed from the film. The film so prepared wa put between two glass plates and dried under tension to give a pale yellowish, transparent film. The resultant film was cut off into a desired size and subjected to elongation at 400° C. to give a tenacious film having a strength of 118 kg/mm² and a modulus of 1,530 kg/mm² in the elongation direction. The film did not undergo change in color and transparency at all even after heat elongation.

EXAMPLE 2

This example illustrates the preparation of an aromatic copolyamide by means of condensation polymerization of 3,5-diaminobenzophenone in admixture with m-phenylenediamine with isophthaloyl chloride and the preparation of a film from the same aromatic copolyamide. As an representative example, a copolyamide which contains 3,5-diaminobenzophenone and m-phenylenediamine in a mole ratio of 5:5 is provided hereinbelow.

1) preparation of poly(5-benzoyl-I 3-phenylene-co-1 3-phenylene)isophthalamide N,N'-dimethylacetamide (240 mL), lithium chloride (9.0 g), 3,5-diaminobenzophenone (6.36 g, 0.03 mole) and m-phenylenediamine (3.18 g) were put into a 500 four-way round bottom flask equipped with a nitrogen inlet, a thermometer and a stirrer while stirring under nitrogen stream. The clear solution thus obtained was cooled to 5° C. Pyridine (14.3 g) was added to the solution. Thereafter, powdered isophthaloyl chloride (12.2 g, 0.06 mole) was added to the resultant mixture at once with vigorously stirring. The viscosity of the mixture increased rapidly in a few minutes resulting in a viscous solution. This was cooled to 25° C. to 40° C. and maintained at the same temperature. After stirring for more than an hour and tightly sealing, the resultant solution was allowed to stand for a day at room temperature to complete the reaction. The resultant was a viscous solution. This solution was milled together with an excess amount of water in a mill. The precipitated polymer powder was recovered by filtration. The recovered polymer powder was washed several times with water, ethanol and acetone, in turn, to completely remove the solvent and unreacted materials, and dried for 6 hours in a vacuum drier at 80° C. The resultant polymer has an intrinsic viscosity of 2.7.

2) Preparation of a film

A completely dried polymer powder which has been prepared in Section 1) above was added to N,N'-dimethylformamide in an amount of 20% by weight and completely dissolved. The resultant solution was filtered through a 400 mesh filter to give a molding solution. The molding solution was subjected to film casting on a glass plate in a film thickness of 0.2 mm by using a push board. The glass plate was placed in a vacuum drier at 60° C. to remove the solvent. The glass plate carrying the film was immersed into water for a day to peel off the film. After removing the solvent, the film so prepared was put between two glass plates and dried under tension to give a pale yellowish, transparent film. The resultant film was cut off into a desired size and elongated at 400° C. to give such a tenacious films as to have a strength of 132 kg/mm$^2$ and modulus of 1,670 kg/mm$^2$ in the elongation direction. The film so prepared undergoes no change in color and transparency at all even after the heat elongation.

EXAMPLE 3

This example illustrates the preparation of an aromatic copolyamide by means of condensation polymerization of a mixture of 3,5-diaminobenzophenone and m-phenylenediamine with a mixture of isophthaloyl chloride and terephthaloyl chloride and the preparation of a film from the same aromatic copolyamide. The example provides a representative example where 3,5-diaminobenzophenone and m-phenylenediamine are used in a mole ratio of 5:5 and isophthaloyl chloride and terephthaloyl chloride in a mole ratio of 85:15.

1) Preparation of an aromatic copolyamide

N,N'-dimethylacetamide (240 ml), lithium chloride (9.0 g), 3,5-diaminobenzophenone (6.36 g, 0.03 mole) and m-phenylenediamine (3.18 g, 0.03 mole) were charged into a 500 mL four-way round bottom flask equipped with a nitrogen inlet, a thermometer and a stirrer. The resultant clear solution was cooled to 5° C. Pyridine (14.3 g) was added to the solution. Thereafter, a mixture of powdered isophthaloyl chloride (10.37 g, 0.051 mole) and terephthaloyl chloride (1.83 g, 0.009 mole) was added to the resultant mixture at once while vigorously agitating. The viscosity of the mixture increased rapidly in a few minutes resulting in a viscous solution, which was cooled to a temperature from 25° C. to 40 ° C. After agitating for more than an hour and tightly sealing, the resultant solution was allowed to stand for a day at room temperature to complete the reaction. The resultant was an opaque solid matter. The resultant was milled together with an excess amount of water in a mill. The precipitated polymer powder was recovered by filtration. The recovered polymer powder was washed several times with water, ethanol and acetone, in turn, to completely remove the solvent and unreacted materials and dried for 6 hours in a vacuum drier at 80° C. The polymer so prepared has an intrinsic viscosity of 2.9.

2) Preparation of a film

A completely dried polymer powder which has been prepared in Section 1) above was added to N,N'-dimethylformamide in an amount of 20% by weight while agitating. The completely dissolved solution was filtered through a 400 mesh filter to give a molding solution. Film casting of the molding solution was effected on a glass plate in a film thickness of 0.2 mm by using a push board. Evaporation of the solvent in a drier at 60° C. gave a transparent film. The glass plate carrying the film was immersed in water to peel off the film. After removing the remaining solvent, the film was put between two glass plates and dried under tension to give a pale yellowish, transparent film. The resultant film was cut off into a desired size and elongated at 400° C. to give a tenacious film. The film so prepared has a strength of 137 kg/mm$^2$ and a modulus of 1,710 kg/mm$^2$. The film undergoes no change in color and transparency at all even after the heat stretching.

What is claimed is:

1. Wholly aromatic polyamides and copolyamides having recurring units of the formula:

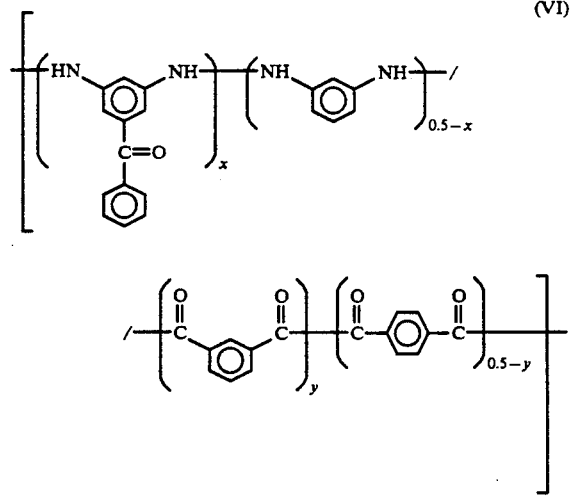

(VI)

wherein x represents the mole fraction of 3,5-diaminobenzophenone based on the total mole number of monomers which participate in the condensation polymerization and has a value ranging from 0.5 to 0.05; y represents the mole fraction of isophthaloyl chloride based on the total mole number of monomers which participate in the condensation polymerization and has a value ranging from 0.5 to 0.

2. A process for the preparation of wholly aromatic polyamides an copolyamides of the formula:

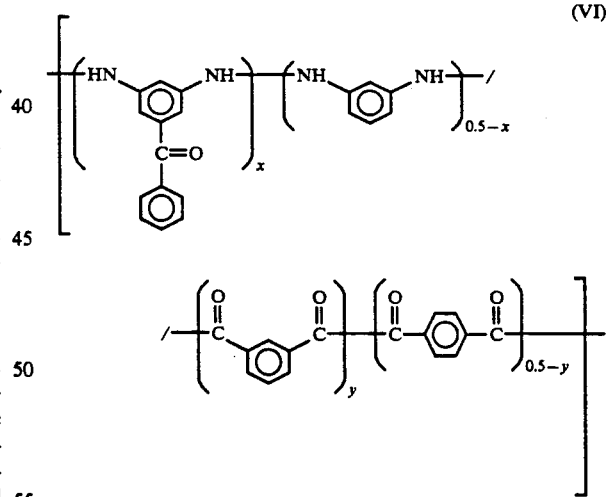

(VI)

wherein x represents the mole fraction of 3,5-diaminobenzophenone based on the total mole number of monomers which participate in the condensation polymerization and has a value ranging from 0.5 to 0.05; y represents the mole fraction of isophthaloyl chloride based on the total mole number of monomers which participate in the condensation polymerization and has a value ranging from 0.5 to 0, which process comprises dissolving an alkali metal salt and then an aromatic tert-amine as an reaction promotor in a tert-amide solvent to give a polymerization solvent; and subjecting an aromatic diamine to condensation polymerization with a chemical equivalent of an aromatic dibasic acid chloride in the polymerization solvent.

3. The process according to claim 2, wherein the aromatic diamine is selected from the group consisting of 3,5-diaminobenzophenone of the formula:

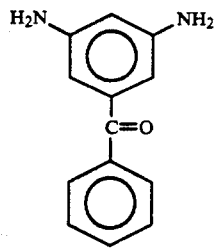

and a mixture thereof with m-phenylenediamine in a given proportion.

4. The process according to claim 2, wherein the aromatic dibasic chloride is isophthaloyl chloride.

5. The process according to claim 2, wherein x is 0.5 to 0.15.

6. The process according to claim 2, wherein the alkali metal salt is selected from the group consisting of lithium chloride and calcium chloride.

7. The process according to claim 2, wherein the aromatic tert-amine is selected from the group consisting of pyridine, picoline and quinoline.

8. The process according to claim 2 or 7, wherein the aromatic tert-amine is used in an amount of 1 to 10% by weight based on the solvent.

9. The process according to claim 2, wherein the tert-amide solvent is selected from the group consisting of N,N'-dimethylacetamide, N-methylpyrrolidinone, N-methylpiperidone, hexamethylphosphoamide, N,N,N',N'-tetramethylurea, N,N40 -diethylaoetamide, N-ethylpyrrolidinone, N-methylcaprolactam and N-acetylpyrrolidinone, and a mixture of at least two thereof.

10. A heat resistant, transparent film resulted from the aromatic polyamides or copolyamides according to claim 1.